Figure 2:
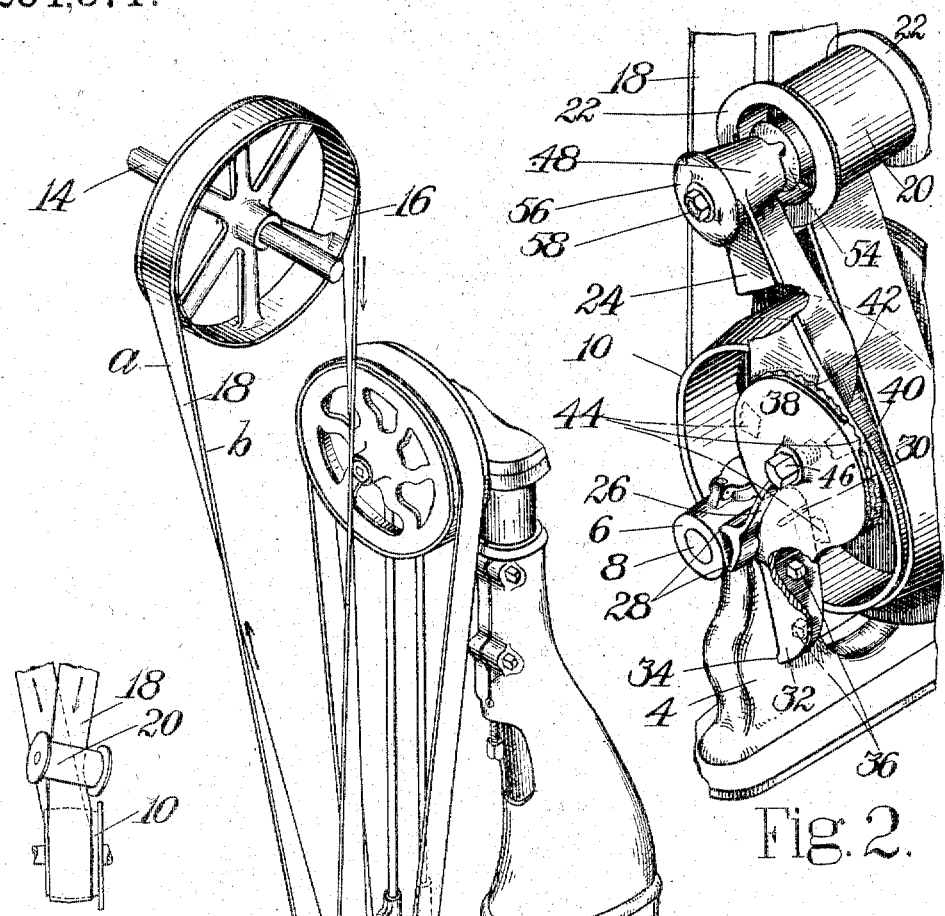

R. F. McFEELY.
BELT CONTROLLING DEVICE.
APPLICATION FILED DEC. 9, 1913.

1,204,371.

Patented Nov. 7, 1916.

WITNESSES.
Edith C. Holbrook
Elizabeth C. Coupe

INVENTOR.
Ronald F. McFeely
By his Attorney
Nelson M. Howard

UNITED STATES PATENT OFFICE.

RONALD F. McFEELY, OF BEVERLY, MASSACHUSETTS, ASSIGNOR TO UNITED SHOE MACHINERY COMPANY, OF PATERSON, NEW JERSEY, A CORPORATION OF NEW JERSEY.

BELT-CONTROLLING DEVICE.

1,204,371.  Specification of Letters Patent.  Patented Nov. 7, 1916.

Application filed December 9, 1913. Serial No. 805,625.

*To all whom it may concern:*

Be it known that I, RONALD F. MCFEELY, a citizen of the United States, residing at Beverly, in the county of Essex and State of Massachusetts, have invented certain Improvements in Belt-Controlling Devices, of which the following description, in connection with the accompanying drawings, is a specification, like reference characters on the drawings indicating like parts in the several figures.

This invention relates to power transmission mechanism and particularly to mechanism of this class in which the power transmitting elements comprise a plurality of pulleys and a connecting belt.

An object of the invention is to provide a belt guiding or tightening device which may form a convenient and ready attachment for pulley bearings wherever the use of such a device may be desirable, and one that shall be readily adjustable and securely held in any position of adjustment.

A further object is to provide means for correcting certain tendencies consequent upon an uneven stretching of a belt or where one edge portion of the belt is for any reason of greater effective length than the opposite edge. It is a well known fact, for example, that where pulleys are arranged so that the belt is given a quarter turn, one edge of the belt in operation is subject to a greater tension than the other edge, which results in a gradual stretching or lengthening of that edge portion which is subjected to the greater tension. When this occurs the belt will tend to run toward that side of a crowned pulley which is adjacent to the stretched edge of the belt, so that for efficiency and safety of operation a readjustment of the pulleys is necessary. The same uneven stretching is also frequently observable in the case of belts that run upon parallel alined pulleys, particularly in the case of leather belts where from the nature of the material one edge portion is more resistant than the other, and this results in the same tendency for the belt to run toward one side of the pulley.

A readjustment of the pulleys such as above referred to must always be effected while the driven machine is out of operation, and it is moreover frequently inconvenient if not impossible to effect any material endwise adjustment of a driven pulley on a machine shaft because of the arrangement of the bearings. The expedient, moreover, is at best but a makeshift, since it simply avoids some of the consequences of the uneven stretching of the belt and does not effect an improvement in the condition of the belt itself. Even after adjustment of the pulleys one edge of the belt remains looser than the other, so that the frictional hold of the belt upon the pulleys remains smaller than originally, and since the pulleys are out of their normal relative positions the belt tends to run crookedly and the efficiency of the transmission mechanism is consequently decreased. If the belt continues to stretch, moreover, repeated readjustments of the pulleys are required, thus entailing inconvenience and loss of time and at best failing to restore the mechanism to its full former efficiency.

This invention has as a further object, therefore, the provision of simple and ready means for correcting the above noted defects frequently encountered in belt transmission mechanism, without the necessity of readjusting the pulleys or stopping the operation of the machine, and moreover to provide such means as will correct the defect at its source and restore the efficiency of the belt itself with the pulleys retained in their normal effective positions.

In the accomplishment of the objects above set forth, features of the invention reside in a novel form of belt guide or tightener including a bracket shaped for ready and convenient attachment to pulley supporting bearings and having provision for accurate adjustment on the bearing, and means for holding the device securely in place; and further in a novel arrangement of mechanism with provision for bodily movement of the idle or belt tightening pulley to different positions upon its supporting bracket for varying the tension of the belt and for clamping the pulley effectively in adjusted position.

A further feature resides in means for bringing a tightening pressure to bear upon that marginal portion of a belt which has become stretched or lengthened with respect to the opposite edge portion, thereby restoring the belt to its original or proper condition with reference to the relative tensions of the opposite edges thereof. This means, in its preferred form, comprises a pulley support and an idle pulley mounted thereon with provision for angular adjustment of the pulley in all directions about a point on the axis of the pulley substantially midway between the opposite ends of the pulley, so that one edge of the belt may be tightened, if desired, without tightening the opposite edge, and the pulley may be inclined at any angle found most effective for correcting the tendency of the belt to run toward one side of the driven pulley. In combination with the above feature the device also includes preferably provision for moving the idle pulley bodily so as to vary as desired the tension of the belt as a whole.

The above and other features of the invention including certain details of construction and combinations of parts will now be described with reference to the accompanying drawings and pointed out in the claims.

Figure 1:
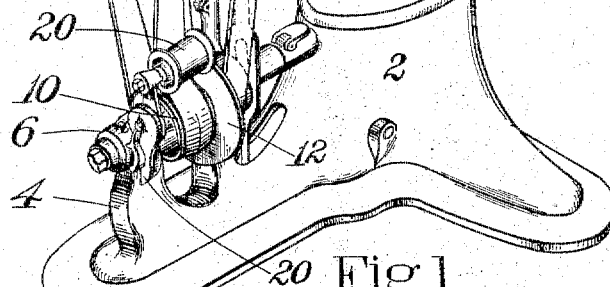
Figure 3:
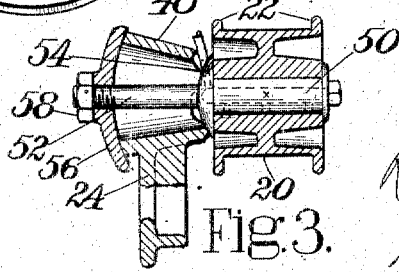

In the drawings, Figure 1 is a perspective view showing the preferred embodiment of the invention as applied to power transmission mechanism used for driving a machine employed in the manufacture of boots and shoes and known as a pulling over machine, Fig. 2 is a view on an enlarged scale of a portion of the structure shown in Fig. 1, Fig. 3 is a detail sectional view of the idle or belt adjusting pulley and its adjustable mounting, and Fig. 4 illustrates one position of adjustment of the idle pulley.

The numeral 2 indicates the supporting base of the pulling over machine. It should be understood, however, that the showing of the device of this invention as applied to this particular machine is by way of illustration only, and that the invention is in no sense limited to this specific use. The base 2 includes a standard 4 which is provided with a bearing 6 for one end of the shaft 8 upon which is mounted the power driven pulley 10 which in this particular machine is provided with a wide flange 12 that forms a part of a friction clutch through which the machine is operated. The driving connections illustrated include a main driving shaft 14 having thereon a pulley 16, and a belt 18 which transmits the power from the pulley 16 to the pulley 10.

For adjusting and tightening the driving belt as required, and in order to assist in retaining it in correct operative position, there is provided a device comprising an idle pulley 20 preferably formed with retaining flanges 22 as shown, this pulley being carried by an arm 24 which is adjustably mounted upon a bracket 26. This bracket is shaped to form a convenient and ready attachment for pulley bearings wherever the use of a device of this character may be desirable, and in order that it may be positioned accurately upon any bearing it is provided with two contact points or edges 28 spaced circumferentially of the bearing member and with a third contact point or edge 30 in an intermediate circumferential position with respect to the other two and spaced therefrom longitudinally of the bearing. For greater stability of mounting the bracket is further provided with an extension 32 and a contact point 34 formed thereon in position to engage the standard 4. With the contact points of the bracket accurately seated upon the bearing and standard so as to locate the device in correct position with respect to the transmission mechanism to which it is to be applied, bolts 36 are employed to retain the bracket securely in place.

The device includes provision for adjustment of the pulley 20 bodily toward and from the belt through a swinging movement of the arm 24 upon the bracket 26. The bracket is shaped to provide a disk-like member 38, and the arm 24 is mounted to turn about an axis substantially at the center of said disk and is provided with a similarly shaped member 40. One of these members, as for example the member 40, is provided upon that face which is opposite to the member 38 with a circular series of teeth or corrugations 42, opposite which on the face of the member 38 are similar teeth or groups of teeth 44 preferably arranged at intervals and spaced equidistantly as shown. The teeth 42 and 44 interengage, as will be evident, and in coöperation with the clamping bolt 46 serve to hold the member 40 and the arm 24 securely in position on the bracket 26. The provision of the large number of relatively small teeth or corrugations on the member 40 makes it possible to effect delicate adjustments of the arm 24 so as to make slight variations in the tension of the belt, while the teeth will insure positive retention of the arm in adjusted position. The comparatively wide separation of the groups of teeth 44 serves to avoid clogging of the device through the accumulation of dirt and waste matter between the teeth and the consequent inefficiency that might result in the case of two opposed circular series of corrugations. At the same time the spacing of the groups at equidistant points insures that the opposite faces of the members 38 and 40 shall be maintained in substantially parallel relation so as to position the pulley accurately with respect to the belt. With this mechanism it will be evident that in order to vary the tension of the belt as a whole it is only necessary to loosen slightly the bolt 46, swing the arm to the desired point of adjustment and again tighten the bolt, the teeth insuring retention of the arm in the precise position of adjustment.

In many installations it is desirable and even necessary, in view of the direction of the line shaft and the desire to face the machine in some particular direction in the room, to make use of a twisted driving belt. In the arrangement illustrated, for example, the machine shaft 8 is at right angles to the direction of the line shaft 14 and the belt consequently is given a quarter turn. In such an arrangement, as is well known, there is a greater tension upon the edge portion $a$ of the belt than upon the edge $b$ and consequently a tendency, particularly in the case of leather belts, for a relative stretching and lengthening of the edge $a$. In consequence of this result the belt will tend to run, in the mechanism illustrated, toward that side of the crowned pulley 10 upon which the flange 12 is located and finally to ride upon the face of the flange, thereby detracting materially from the efficiency of the transmission device. In order to correct this tendency and cause the belt to run evenly upon the pulleys, this invention in its preferred embodiment includes provision for adjustment of the idle pulley 20 so as to increase when necessary the relative tension of the edge $a$ of the belt and so restore the belt to its normal condition of tension. In order that one edge portion of the belt may be tightened without tightening, unless desired, the other edge portion, the pulley 20 is adjustable angularly about a point on its axis located between the ends of the pulley and preferably midway between said ends, this point being indicated by a cross on Fig. 3. For securing the above results the pulley mounting comprises a support or holder 48 on the arm 24, this holder having substantially the shape of a hollow cone open at both ends, the walls of which converge in the direction of the pulley, and the pulley is mounted on a bearing member or spindle 50 from which an extension or rod 52 projects through the holder 48. The opening in the smaller end of the holder is larger in diameter than the extension 52 so as to permit said extension to swing in effecting adjustment of the pulley in the manner pointed out. The bearing 50 is provided with a cap member 54 having a convex face seated upon the smaller end of the holder, and on the other end of the holder, which is suitably convexed, is seated a cap 56 with a concave face adjacent to the holder. The extension 52 projects through the cap 56 and has threaded upon the end thereof a nut 58 which engages the cap. The faces of the clamp members 54 and 56 adjacent to the holder are, it will be understood, so curved that swinging movement of the rod 52 in any direction within the limits of the walls of the conical holder serves to swing the pulley 20 about the medial point before referred to, the parts thus affording substantially a universal adjustment for the pulley. A tightening of the nut 58 in any angular position of the parts draws the members 54 and 56 toward each other and against the ends of the holder, thereby securely clamping the pulley in adjusted position.

In the use of the device to vary the relative tension of one edge portion of a belt the pulley 20 will be swung ordinarily in a plane substantially perpendicular to the line of the belt. In some instances, however, better results may be secured by inclining the pulley diagonally as represented in Fig. 4, and such adjustment, and in fact angular adjustment in any direction desired, may be effected with this device.

Although the device is shown as applied to a twisted belt, it will be understood that it may be applied as well to a straight belt running on parallel pulleys where conditions are such that its use is desirable. It will be evident, moreover, that the device combines provision for varying the relative tension of one edge of a belt through adjustment of the idle pulley angularly and also provision for varying the tension of the belt as a whole through swinging movement of the arm 24.

Although I have disclosed the invention as embodied in a device having the specific features of construction shown and described, it should be understood that the invention is not thus restricted in its application but that various other embodiments are comprehended within the spirit and scope thereof as defined in the claims.

Having described the invention, what I claim as new and desire to secure by Letters Patent of the United States is the following:—

1. In power transmission mechanism, the combination with a pulley stand and bearing, a pulley mounted for turning movement in said bearing, a second pulley, and a belt connecting said pulleys, of a bracket having a three point contact with said bearing, one of said points being spaced longitudinally of the bearing from the other two points, clamping means for securing the bracket with its three points in firm contact with the bearing, and an idle pulley supported by the bracket and arranged to contact with the belt.

2. In power transmission mechanism, the combination with a pulley stand and bearing, a pulley mounted for turning movement in said bearing, a second pulley, and a belt connecting said pulleys, of a bracket having contact with said bearing at a plurality of points and also having a contact point on the stand, clamping means having provision for adjustment of the bracket to bring the several points into firm contact with the bearing and stand, and an idle pulley supported by the bracket and arranged to contact with the belt.

3. In power transmission mechanism, the combination with pulleys and a connecting belt, of a belt adjusting device comprising a supporting bracket, an arm mounted to turn upon said bracket to different positions of adjustment, and a belt tightening pulley carried by said arm, said bracket and arm being formed to present opposed contact members one of which is provided with a plurality of teeth or corrugations arranged in a continuous circular series, said other member having a plurality of separated groups of teeth arranged for engaging said teeth on the first named member in different positions of adjustment of said arm.

4. In power transmission mechanism, the combination with pulleys and a connecting belt, of a belt adjusting device comprising a supporting bracket, an arm mounted to turn upon said bracket to different positions of adjustment, a belt tightening pulley carried by said arm, said bracket and arm being formed to present opposed contact members one of which is provided with a plurality of teeth or corrugations arranged in circular series about the axis of turning movement of said arm, said other member having means for engaging said teeth at three or more locations symmetrically spaced apart about said axis at relatively wide intervals, and means for clamping said members together in adjusted position.

5. In power transmission mechanism, the combination with pulleys and a connecting belt of which one edge portion is of greater length than the other edge portion, of means arranged to bear upon said longer portion of the belt to tighten said portion without affecting materially the tension of the opposite edge of the belt, so as to correct the tendency of the belt to run unevenly upon the pulleys.

6. In power transmission mechanism, the combination with pulleys and a connecting belt, of means for tightening the belt as a whole, said means being constructed and arranged also for varying the tension of one edge portion of the belt with respect to that of the other edge portion.

7. In power transmission mechanism, the combination with transmission pulleys and a connecting belt, of a belt tightening pulley arranged to contact with the belt and adjustable to increase the tension of one edge portion of the belt without increasing the tension of the other edge portion.

8. In power transmission mechanism, the combination with transmission pulleys and a connecting belt, of an idle pulley mounted in position to contact with the belt and adjustable in a plane transverse to the line of the belt about an axis extending at an angle to the axis about which the pulley rotates and located between the ends of the pulley.

9. In power transmission mechanism, the combination with transmission pulleys and a connecting belt, of an idle pulley mounted in position to contact with the belt and adjustable bodily to vary the tension of the belt as a whole, said pulley being adjustable also angularly in a plane transverse to the line of the belt about a fixed point on its axis substantially midway between the ends of the pulley to vary the tension of one edge portion of the belt with respect to that of the other edge portion.

10. In power transmission mechanism, the combination with transmission pulleys and a flat belt running on said pulleys, of belt adjusting means comprising a pulley support, a belt adjusting pulley, and a pulley carrying spindle having a universal bearing upon said support, said bearing being formed to provide for adjustment of the pulley angularly about a point on its axis located between the ends of the pulley and in planes transverse to the line of the belt to vary the relative tensions of opposite edge portions of the belt.

11. In power transmission mechanism, belt adjusting means comprising a pulley support having formed therein an opening which enlarges progressively from one end to the other thereof, a bearing member having an extension projecting within said opening, all portions of said extension within the opening being smaller in cross section than the opening to permit the extension to be swung from side to side to effect angular adjustment of the bearing member, an idle pulley mounted on said bearing member adjacent to the narrower end of said opening, and means for securing said bearing member and extension in different positions of angular adjustment with respect to said support.

12. In power transmission mechanism, belt adjusting means comprising a pulley support having a substantially straight opening formed therein, a bearing member having an extension projecting within said opening, and an idle pulley mounted on said bearing member adjacent to said opening, the walls of said opening being of substantially conical formation converging in the direction of said pulley to permit said extension to be swung in any direction within the opening to effect angular adjustment of the pulley.

13. In power transmission mechanism, belt adjusting means comprising a pulley support having an opening formed therein, a bearing member having an extension of smaller cross section throughout than said opening and projecting within the opening, a pulley mounted on said bearing member, and a cap carried by said member and having a convex face seated upon the outer end of the support at one end of said opening, said cap and extension being adjustable angularly with respect to said support to effect angular adjustment of the pulley.

14. In power transmission mechanism, belt adjusting means comprising a pulley support shaped to provide a holder with an opening therethrough which enlarges progressively from one end to the other thereof, a pulley bearing member having an extension projecting through the opening in said holder from the smaller end thereof and adjustable angularly therein, said bearing member being provided with a cap with a convexly curved face seated upon the holder at the smaller end of said opening, a second cap having a concave face seated upon the holder at the larger end of said opening and through which said bearing extension projects, and a pulley mounted on said bearing member, said parts being shaped to provide for adjustment of the pulley angularly about a point on its axis substantially midway between the ends of the pulley.

15. In power transmission mechanism, belt adjusting means comprising a pulley support shaped to provide a holder substantially in the form of a hollow cone open at both ends, a pulley bearing member having an extension projecting through the opening in said holder and adjustable angularly therein, said bearing member being provided with a cap seated upon the narrower end of the holder, an idle pulley mounted on said bearing adjacent to said cap, a cap having a concave face seated upon the wider end of said holder and provided with an opening through which said bearing extension projects, and means engaging said last named cap and the extension for securing the bearing in adjusted position.

In testimony whereof I have signed my name to this specification in the presence of two subscribing witnesses.

RONALD F. McFEELY.

Witnesses:
CHESTER E. ROGERS,
LAURA M. GOODRIDGE.

It is hereby certified that in Letters Patent No. 1,204,371, granted November 7, 1916, upon the application of Ronald F. McFeely, of Beverly, Massachusetts, for an improvement in "Belt-Controlling Devices," errors appear in the printed specification requiring correction as follows: Page 4, line 109, claim 12, for the words "substantially straight" read *an;* same page and claim, line 111, for the article "an" read *a substantially straight;* and that the said Letters Patent should be read with these corrections therein that the same may conform to the record of the case in the Patent Office.

Signed and sealed this 30th day of January, A. D., 1917.

[SEAL.]

F. W. H. CLAY.
*Acting Commissioner of Patents.*

Cl. 64—5.